TAKAO YAMAZAKI,
INVENTOR

United States Patent Office 3,560,272
Patented Feb. 2, 1971

3,560,272
METHOD FOR MANUFACTURING HIGH TENSILE STRENGTH BOLTS HAVING ENHANCED STRESS-CORROSION RESISTANCE
Takao Yamazaki, 1-18 Kugenuma-kaigan, 6-chome, Fujisawa-shi, Kanagawa-ken, Japan
Filed Dec. 4, 1968, Ser. No. 781,106
Claims priority, application Japan, Jan. 22, 1968, 43/3,228
Int. Cl. C21d *1/74, 1/80*
U.S. Cl. 148—16    3 Claims

ABSTRACT OF THE DISCLOSURE

A method of manufacturing high tensile strength bolts which have excellent stress-corrosion resistance and mechanical properties, and bolts manufactured by the method. The method comprises the steps of decarburizing the surface layer of the bolt to a depth of about 0.2 mm., heating the bolt and then quenching and tempering the decarburized bolt.

---

The present invention relates to a method of manufacturing high tensile strength bolts having excellent stress-corrosion resistance and mechanical strength and to high tensile strength bolts manufactured by the method.

The principal object of this invention is to eliminate the serious drawbacks possessed by this kind of bolt by enhancing their stress-corrosion resistance to a marked extent.

This object is achieved by first decarburizing the surface layer of the bolt to a depth of about 0.2 mm., and then heating the bolt at about 950° C. and quenching it, and then tempering the quenched bolt at about 400° C.

Figure 1:
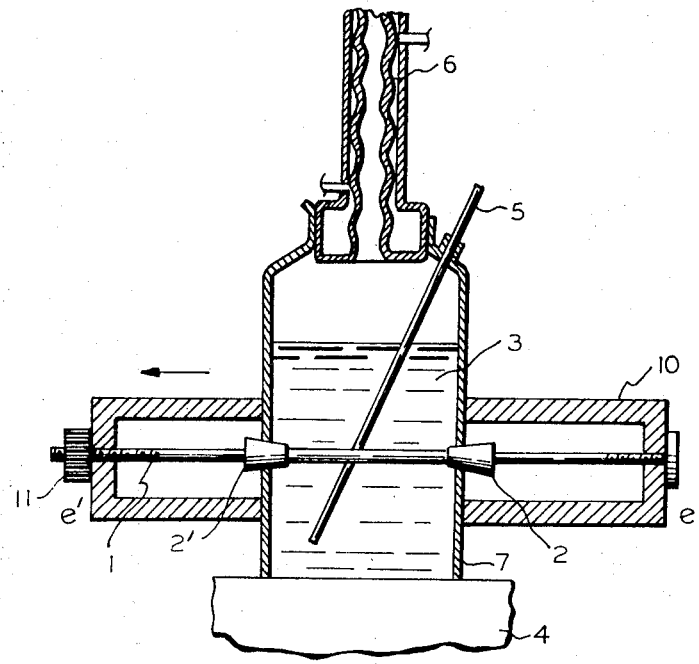
Figure 2:
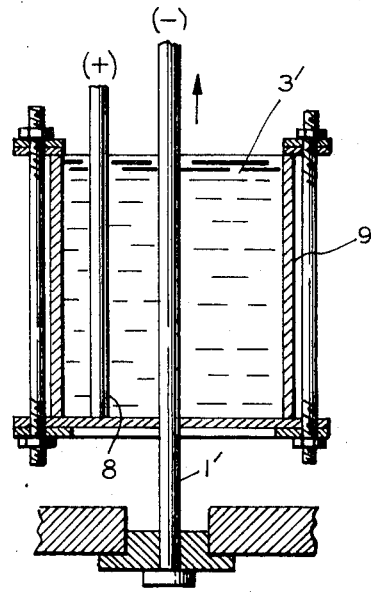

Other objects and advantages of the invention will become apparent from the following description taken in connection with the accompanying drawings, in which:

FIG. 1 is a sectional elevation view of a testing apparatus for testing the stress-corrosion resistance of high tensile strength bolts; and FIG. 2 is a sectional elevation view of a testing apparatus for testing for delayed failure.

High tensile strength bolts nowadays generally have mechanical properties such as set forth in Table 1, and which are according to, for example, Japanese Industrial Standards (JIS)). In the table, the article 13T is supposed to be best in the strength.

TABLE 1

| Notation | Tensile strength, kg./mm.² | Yielding point, kg./mm.² | Elongation, percent | Reduction of cross sectional area, percent | Hardness (Rockwell) |
|---|---|---|---|---|---|
| 7T, 1 piece | 70 | | >14 | >35 | RB95 ~ Rc30 |
| 9T, 2 pieces | 90 | 70 | >14 | >35 | Rc26~Rc35 |
| 11T, 3 pieces | 110 | 95 | >14 | >35 | Rc33~Rc40 |
| 13T, 4 pieces | 130 | 110 | >14 | >35 | Rc36~Rc45 |

In general, however, bolts for use in a long-span bridge or the like must have a strength much higher than those set forth in the table, and in many other uses even the said 13T high tensile strength bolt will cause trouble by breaking in the neighborhood of its head so that the head will break off because the stress-corrosion resistance is poor.

Various experiments and studies have been carried out recently in an attempt to find a solution to this difficulty with high tensile strength bolts.

As a result of strenuous efforts, applicant has discovered a method of manufacturing high tensile strength bolts which have excellent mechanical strength and the stress-corrosion resistance of which has been greatly increased. The method involves decarburization of the surface layer of the bolt and quenching and tempering the decarburized bolt.

The increased mechanical strength and stress-corrosion resistance of the high tensile strength bolts manufactured by the aforementioned method will be demonstrated by the following example and by reference to FIGS. 1 and 2, as well as Tables 2–4.

A steel having the composition shown in Table 2 was melted in a 50 kg. high frequency furnace and was hot-rolled into steel bars having diameters of from about 9.5 to 16 mm.

TABLE 2

| | |
|---|---|
| C | 0.43 |
| Si | 0.53 |
| Mn | 0.73 |
| P | 0.029 |
| S | 0.022 |
| Fe | Rem. |

The hot rolled steel bars having lengths of about 400 mm. had a part of the outer periphery of each bar threaded. The surface layer of some of the specimens was decarburized by holding the specimens in a gas which was a mixture of propane and air in a ratio 1:3.2 by volume for 1.5 hours at a temperature of 840° C. This produced a decarburized surface having a thickness of from about 0.2 mm. to about 0.3 mm. No decarburization was carried out on the remainder of the specimens. All the specimens were heated at a temperature of from 850–1,000° C. for 10 to 60 min., and quenched in water of room temperature, and thereafter tempered at about from 200–550° C. for 30–60 min. The thus processed specimens were tested for stress-corrosion resistance and delayed failure.

The testing for stress-corrosion resistance was carried out under the conditions of Table 3, which is a prevalent test for steel materials used in prestressed concrete.

TABLE 3: TEST CONDITIONS

| | |
|---|---|
| Test solution | $Ca(NO_3)_2$ (87%)+$NH_4NO_3$ (3%)+$H_2O$ (10%). |
| Test temperature | 115±5° C. |
| Test stress | 7/12 of tensile strength. |
| Test | Measuring the time to fracture the test piece. |

The stress-corrosion resistance testing device employed was as shown in FIG. 1. Rubber stoppers 2 and 2' hold the specimen 1 immersed in the test solution 3 in a container 7 positioned on a heater 4. After a specified tensile stress was applied by a tension testing device while holding the head of the specimen at the end *e* of holder 10, the threaded end of the specimen is fixed in position by a knurled nut 11 at end *e'* of holder 10. A thermometer 5 is inserted into the container and a condenser 6 is provided at the top thereof for condensing the water vapor generated by water boiled off the test solution 3 and returning it to solution 3.

In evaluating the test results, the following criteria were used. If the time to fracture was 24 hours or less, very strict limitations on the use of the bolts will be necessary, and very close control of conditions will be necessary. If the time to fracture is 24 to 48 hours, some limitations on the use and some attention to the conditions should be observed. If the time to fracture is 48 to 72 hours, no restriction on the use is necessary, and if the time to fracture is 72 hours and up, the bolt is considered to be excellent.

The results of the test for the mechanical properties of the specimens, the surface layer of which has been decarburized, were as shown in Table 4, and the results of the tests for stress-corrosion resistance on all the specimens were as follows: the specimens having the surface layer decarburized to a depth of about 0.2 mm. did not fracture even after more than 72 hours had elapsed, but the specimens with respect to which no decarburization treatment was carried out fractured in only 2 to 4 hours.

TABLE 4

Tensile strength (kg./mg.$^2$) _____ Above 143
Yielding point (kg./mg.$^2$) _____ Above 135
Elongation (gauge length-8 times the diameter) _____ 8

Delayed failure tests were also conducted on specimens having the same composition and made by the same manufacturing process as those on which the stress-corrosion resistance tests were carried out.

The delayed failure testing device employed was as shown in FIG. 2. The sample 1' was immersed an $H_2SO_4$ solution 3' of pH 1, and a tensile stress of 70% of the tensile strength possessed by the said specimen 1' and in the direction of the arrow was applied by a tension tester (not shown). A cathode current of 1.7 ma./cm.$^2$ was caused to flow through the specimen 1'. An anode 8 made of platinum is provided in the solution which is contained in a rubber container 9 which engages in a leakproof fashion around specimen 1'.

The times to fracture for the specimens were as follows: the specimens having the decarburized surface layer of a thickness of about 0.2 mm. did not fracture even after more than 50 hours had elapsed, but the specimens on which no decarburization treatment was conducted fractured in only from 0.4 to 2 hours.

The results of the above described tests for stress-corrosion resistance and delayed failure coincided with many other test results obtained by applicant on specimens of various compositions, as follows:

TABLE 5

|   | Percent |
|---|---|
| C | 0.15–5 |
| Si | 0.15–2.5 |
| Mn | 0.5–1.5 |
| P | <0.03 |
| S | <0.03 |
| Cr | 2 and less |
| Ni | 1 and less |
| Mo | 1 and less |
| Fe | Rem. |

From the test results obtained, it will be seen that the effect of the enhancement of resistance to stress-corrosion and delayed failure produced by the method of this invention is very great. The comparison of the test results for the test pieces on which the method of this invention has not been carried out with the test result of the specimens on which the present method has been carried out by quenching and tempering the material after decarburizing their surface layer to a depth of about 0.2 mm., shows that the test pieces, the surface layer of which has been decarburized, do not fracture even after more than 72 hours has elapsed in the stress-corrosion resistance tests, and do not fracture after more than 50 hours have elapsed in the delayed failure tests. Moreover, as is shown in Table 4, the specimens on which the method of the invention has been carried out have excellent mechanical properties.

The applicant has experimentally confirmed that in carrying out the present invention, it does not matter whether a part of or all of the outer periphery of the material is threaded and its surface layer is then decarburized, and the threaded decarburized piece is then quenched and tempered, or whether the decarburized surface layer of the steel material is threaded, and then is quenched and tempered. Both ways will produce the same improved results.

By following the method of this invention, it has become possible to provide high tensile strength bolts which can answer satisfactorily the demands for the high tensile strength bolts to fulfill the severe requirements demanded of them.

What is claimed is:
1. A method of manufacturing high tensile strength bolts, comprising forming a bolt from a steel composition consisting essentially of C 0.15–0.50%, Si 0.15–2.5%, Mn 0.5–1.5%, P less than 0.030%, S less than 0.030% and the remainder Fe, decarburizing the bolt to form a decarburized surface layer thereon having a depth of from about 0.2–0.3 mm., quenching the decarburized bolt in a quenching liquid at ambient temperature, and tempering the quenched bolt at a temperature of from about 200–550° C. for a time of from about 30 to about 60 minutes.

2. A method as claimed in claim 1 in which the decarburizing step comprises heating the bolt in a mixture of propane and air in a ratio of about 1:3.2 by volume for about 1.5 hours at a temperature of about 840° C.

3. A method as claimed in claim 1 in which the steel composition further has Cr in an amount of 2% and less, Ni in an amount of 1% and less, and Mo in an amount of 1% and less.

References Cited
UNITED STATES PATENTS
3,271,206  9/1966  Goda et al. _____ 148—143
3,323,953  6/1967  Lesney _____ 148—39

L. DEWAYNE RUTLEDGE, Primary Examiner
W. W. STALLARD, Assistant Examiner

U.S. Cl. X.R.
148—39